United States Patent [19]

Mikami et al.

[11] Patent Number: 5,290,320
[45] Date of Patent: Mar. 1, 1994

[54] FIBER TREATMENT AGENT

[75] Inventors: Ryuzo Mikami; Isao Ona, both of Chiba, Japan

[73] Assignee: Dow Corning Toray Silicone Co., Ltd., Tokyo, Japan

[21] Appl. No.: 871,242

[22] Filed: Apr. 20, 1992

[30] Foreign Application Priority Data

Apr. 24, 1991 [JP] Japan .................. 3-122232

[51] Int. Cl.$^5$ .................. D06M 15/00; D06M 23/00
[52] U.S. Cl. .................. 8/115.6; 8/116.1; 8/120; 8/115.62
[58] Field of Search .................. 8/115.6, 116.1, 120, 8/115.62

[56] References Cited

U.S. PATENT DOCUMENTS

| | | | |
|---|---|---|---|
| 4,152,273 | 5/1979 | Weiland | 8/115.6 |
| 4,520,176 | 5/1985 | Martin et al. | 8/115.6 |
| 4,960,431 | 10/1990 | Cordova et al. | 8/115.6 |
| 5,078,747 | 1/1992 | Kästele et al. | 8/181 |

Primary Examiner—Patrick P. Garvin
Assistant Examiner—E. D. Irzinski
Attorney, Agent, or Firm—James L. DeCesare

[57] ABSTRACT

A fiber treating agent which is a silicone modified polyester in which a polyester has a polyoganosiloxane grafted thereto. The grafted polyester is the reaction product of an allyl ether containing polyester and a polyorganosiloxane wherein at least one of the silicon atoms of the polyorganosiloxane has a hydrogen atom attached thereto. Preferably, the hydrogen atom is attached to one terminal end of the polyorganosiloxane. The reaction product is modified by reacting the reaction product with a polycarboxylic anhydride, and the amine salt of the modified reaction product may be formed by reacting the modified reaction product with an aminoalkylalkoxysilane. Methods of treating fibrous materials are also described.

9 Claims, No Drawings

FIBER TREATMENT AGENT

The present invention relates to a novel fiber treatment agent.

Various types of organopolysiloxanes and compositions thereof have been used as fiber treatment agents for the purpose of imparting various properties (flexibility, smoothness, wrinkle resistance, rebound) to fibrous materials composed of, for example, natural fibers (e.g., cotton, flax, silk, wool, angora, and mohair), regenerated fibers (e.g., rayon and bemberg), semisynthetic fibers (e.g., acetate), and synthetic fibers (e.g., polyester, polyamide, polyvinyl chloride, vinylon, polyethylene, polypropylene, and spandex). Not only do these fiber treatment agents provide fabrics, cotton, etc., with flexibility, wrinkle resistance, and rebound, they are also excellent for imparting a feather-like handle to polyester staple fiber and for imparting lubricity to thread for mechanical sewing operations. Large quantities of amino group-containing amino-modified organopolysiloxanes are employed in these applications.

However, the amino group-containing amino-modified organopolysiloxanes undergo yellowing as a consequence of aging or heat treatment. Furthermore, they are too slick and cannot provide a near-natural handle, for example, a feather-like handle.

SUMMARY OF THE INVENTION

The present invention takes as its object a solution to the aforementioned problems through the introduction of a fiber treatment agent which does not yellow, which produces little slickness, and which provides a dry touch and excellent smoothness.

DETAILED DESCRIPTION OF THE INVENTION

The present invention relates to a fiber treatment agent whose principal component is a silicone-modified polyester in which a polyorganosiloxane is grafted onto the polyester.

To explain the preceding in greater detail, the fiber treatment agent according to the present invention contains as its principal component a silicone-modified polyester in which an organopolysiloxane is grafted onto the polyester (abbreviated below as polyorganosiloxane-grafted polyester resin). The polyester resin constituent of this polyorganosiloxane-grafted polyester may be an aliphatic or aromatic polyester, and it may have a straight-chain or branched-chain molecular structure. However, straight-chain polyesters with an average molecular weight of 500 to 5,000 are generally preferred.

The grafting polyorganosiloxane preferably has a straight-chain structure. The degree of polymerization for the grafting polyorganosiloxane is not specifically restricted as long as it is at least 2. However, degrees of polymerization below 2,000 are generally employed due to the acquisition problems associated with very high degrees of polymerization and due to the poor addition reactivity of the starting polysiloxane for high degrees of polymerization. Average degrees of polymerization of 3 to 100 are preferred from the standpoint of the modifying effect. The siloxane making up the grafting polyorganosiloxane is exemplified by dimethylsiloxane, methylalkylsiloxane ($C_2$ to $C_{10}$ alkyl), methylphenylsiloxane, methylsiloxane, trimethylsiloxane, and dimethylbutylsiloxane.

The polyorganosiloxane-grafted polyester can be prepared, for example, by any of the following methods: (i) the condensation reaction of polyorganosiloxane having 2 carbinol groups at one molecular chain terminal with polycarboxylic acid or chloride thereof; (ii) the condensation reaction of polyorganosiloxane having 2 carboxyl groups at one terminal with polyhydric alcohol; (iii) and the condensation reaction of carbinol-containing polyester resin with polyorganosiloxane having hydroxyl, silicon-bonded hydrogen, or a hydrolyzable group (e.g., alkoxy) at one terminal. The present inventors have proposed a forth preparative method within this sphere (Japanese Patent Application Number 01-138041 [138,041/89]). In the method, polyester containing aliphatically unsaturated bonds is first synthesized, and this unsaturated polyester is addition reacted in the presence of a platinum compound catalyst with a polyorganosiloxane bearing SiH at one molecular chain terminal. Among the preceding, the lattermost fourth method is preferred since the polyester is synthesized first and the polyorganosiloxane is subsequently introduced into the polyester side chains under milder conditions.

The polycarboxylic acid which may be employed as starting material for the polyester is exemplified by adipic acid, phthalic anhydride, isophthalic acid, and terephthalic acid. The starting polyhydric alcohol is exemplified by ethylene glycol, neopentyl glycol, trimethylolpropane, trimethylolethane, trimethylolpropane monoallyl ether, trimethylolethane monoallyl ether, glycerol, glycerol monoallyl ether, pentaerythritol, pentaerythritol monoallyl ether, and pentaerythritol diallyl ether.

The silicon-bonded organic groups in the aforesaid monoterminal-functional polyorganosiloxanes are exemplified by alkyl groups such as methyl, ethyl, and propyl; by substituted alkyl groups such as 3,3,3-trifluoropropyl; and by aryl groups such as phenyl. The methyl group is preferred for the corresponding low cost of the starting material and the associated performance. This monoterminal-functional polyorganosiloxane is more specifically exemplified as follows.

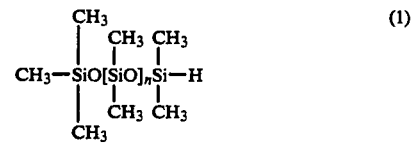

(1)

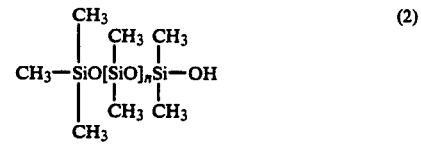

(2)

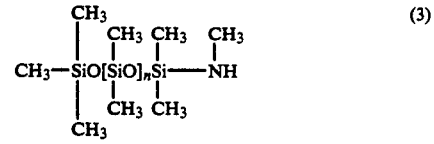

(3)

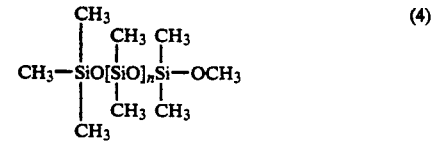

(4)

-continued

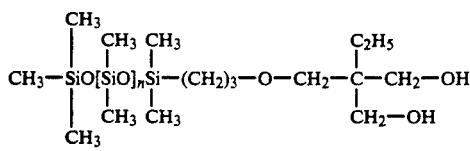

(5)

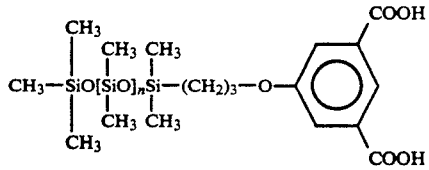

(6)

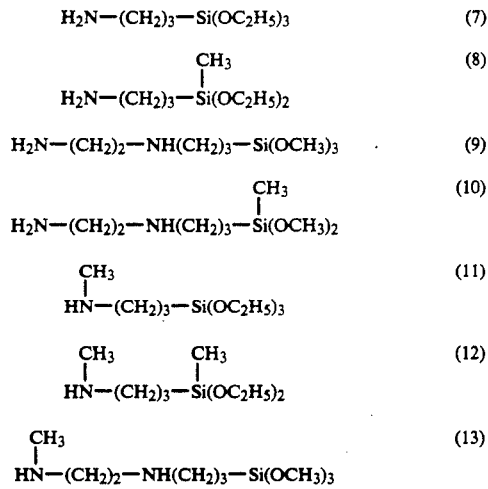

The fiber treatment agent according to the present invention may be applied to fibrous material after emulsification using an emulsifying agent or after dissolution in an organic solvent such as toluene, xylene, benzene, n-hexane, heptane, acetone, methyl ethyl ketone, methyl isobutyl ketone, ethyl acetate, butyl acetate, mineral terpene, perchloroethylene, trichloroethylene, and tetrahydrofuran.

The emulsifying agent is preferably a nonionic or anionic surfactant or a combination thereof. The nonionic surfactant is exemplified by polyoxyalkylene alkyl ethers, polyoxyalkylene alkylphenol ethers, polyoxyalkylene alkyl esters, polyoxyalkylene sorbitan alkyl esters, polyethylene glycols, polypropylene glycols, and diethylene glycol. The anionic surfactant is exemplified by the salts of the sulfate esters of higher alcohols, alkylbenzenesulfonates, the salts of the sulfate esters of polyoxyethylene alkylphenol ethers, and the sodium salts of higher fatty acids.

In order to emulsify the fiber treatment agent according to the present invention, a small quantity of water and surfactant as described above are first added to the carboxyl-containing polyorganosiloxane-grafted polyester with mixing to homogeneity, and emulsified in a homogenizer, colloid mill, line mixer, propeller mixer, or vacuum emulsifier.

In a preferred embodiment of the present invention, the silicone-modified polyester comprises a carboxyl-containing silicone-modified polyester. With reference to the polyorganosiloxane-grafted polyesters whose preparation is described hereinbefore, said carboxyl-containing silicone-modified polyester can be prepared by reacting the carbinol-containing polyester with polycarboxylic anhydride. In other words, using the above-described preparative methods for the polyorganosiloxane-grafted polyester, a polyorganosiloxane-grafted polyester is prepared which contains residual carbinol. The carboxyl group is then readily introduced by reaction of the residual carbinol with polycarboxylic anhydride as follows.

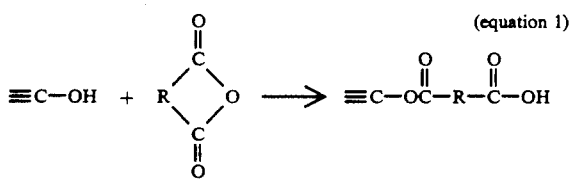

(equation 1)

The polycarboxylic anhydride is exemplified by succinic anhydride, citraconic anhydride, itaconic anhydride, dodecenylsuccinic anhydride, maleic anhydride, hexahydrophthalic anhydride, methyltetrahydrophthalic anhydride, phthalic anhydride, trimellitic anhydride, pyromellitic anhydride, methylnadic anhydride, and 3,3',4,4'-benzophenonetetracarboxylic anhydride.

The carboxyl-containing silicone-modified polyester can be prepared by reaction of the polycarboxylic anhydride with the carbinol groups in the polyorganosiloxane-grafted polyester. This reaction can be conducted using the relatively mild conditions of 50° to 200° C. for 10 to 60 minutes. Furthermore, a tertiary amine may optionally be used as a reaction-accelerating catalyst, for example, triethanolamine, tetramethylbutanediamine, tetramethylpentanediamine, triethylenediamine, dimethylaniline, and dimethylbenzylamine. The carboxyl-containing silicone-modified polyester thus prepared may be directly used as a fiber treatment agent.

To improve the dispersibility in water, a salt may be formed between the aforesaid carboxyl groups and any of various types of bases, for example, an amine. The use of an aminoalkylalkoxysilane as the amine compound is desirable since this makes it possible after fiber treatment to obtain a crosslinked structure through the hydrolysis and condensation reactions of the terminal alkoxy groups. The aminoalkylalkoxysilane is exemplified by compounds with the following chemical structures.

With regard to the method for treating fibrous material with the fiber treatment agent according to the present invention, the agent is applied by spray application, roll application, brush coating, and immersion. The fibrous material is then further processed by standing at ambient temperature, heating, or exposure to a hot draft. The add-on will vary with the type of fibrous material being treated and should generally fall within the range of 0.01 to 5.0 weight % and preferably within the range of 0.05 to 2 weight %, in each case as the polyorganosiloxane fraction with respect to the fibrous material.

The fibrous material is exemplified by natural fibers such as wool, silk, flax, cotton, angora, mohair, and asbestos; by regenerated fibers such as rayon and bemberg; by semisynthetic fibers such as acetate; by synthetic fibers such as polyester, polyamide, polyacrylonitrile, polyvinyl chloride, vinylon, polyethylene, polypropylene, and spandex; and by inorganic fibers such as glass fiber, carbon fiber, and silicon carbide fiber. Its form is exemplified by a staple, filament, tow, and top yarn, while its arrangement is exemplified by knits, weaves, and nonwovens.

The fiber treatment agent according to the present invention may be employed on an optional basis with an epoxysilane, thickener, colorant, preservative, antimicrobial, corrosion inhibitor, or condensation reaction catalyst (organotin compound or organozinc compound).

The present invention is explained in greater detail below through illustrative and reference examples to which, however, should not be construed as limiting the present invention. In the illustrative and reference examples, parts refers to weight parts and % refers to weight %.

REFERENCE EXAMPLE 1

Preparation of fiber treatment agents A1 and A2

(1) Synthesis of allyl ether-containing polyester 116.8 parts adipic acid, 72.8 parts trimethylolpropane monoallyl ether, 72.8 parts neopentyl glycol, and 35 parts xylene were placed in a four-neck flask equipped with nitrogen inlet, stirrer, thermometer, and reflux condenser equipped with a distillation tube, and the temperature was gradually raised to 220° C. The reaction was continued for approximately 8 hours at this temperature and sampling was begun. Heating was discontinued when the acid value of the reaction product reached 3.0. The low boiling constituents were subsequently distilled out in vacuo to afford the allyl ether-containing polyester. The allyl ether-containing polyester product had a carbinol content of 1.19%.

(2) Synthesis of the polyorganosiloxane-grafted polyester

The following were introduced into a 3,000 mL three-neck flask equipped with stirrer, reflux condenser, and thermometer and dissolved to homogeneity; 100 parts polyester from step (1); 1,280 parts tetrahydrofuran; and 220 parts of a polydimethylsiloxane with an average molecular weight of 3,676 and carrying SiH functionality at one terminal (SiH content=0.0272%, see structure (14) below). After dissolution, the temperature was gradually raised to achieve reflux, at which point a 1% solution of chloroplatinic acid in tetrahydrofuran was added in a quantity sufficient to give a platinum concentration of 10 parts per 1,000,000 parts of the reaction mixture. The reaction was carried out under reflux while periodically sampling the reaction mixture onto a glass plate. The solvent was evaporated off, and the reaction was halted when the reaction product was observed to be transparent. Subsequent removal of the solvent by distillation afforded a polydimethylsiloxane-grafted polyester (carbinol content=0.33%) in the form of a paste.

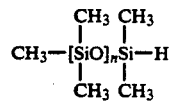
(14)

(3) Synthesis of the carboxyl-containing polydimethylsiloxane-grafted polyester and its amine salt 28.4 parts of the polydimethylsiloxane-grafted polyester from step (2) and 1.06 parts trimellitic anhydride were placed in a 100 mL three-neck flask equipped with stirrer, thermometer, and reflux condenser. The temperature was gradually raised to 160° C., and a reaction was carried out for approximately 40 minutes at 160° to 170° C. Then 29.46 parts tetrahydrofuran was added to provide a 50% solution of the polydimethylsiloxane-grafted polyester. The thusly obtained carboxyl-containing polydimethylsiloxane-grafted polyester had an acid value of 64.4. This solution of carboxyl-containing polydimethylsiloxane-grafted polyester (50% effective fraction) was designated as fiber treatment agent A1. Fiber treatment agent A2 was prepared by the addition of 5.45 parts of a 50% tetrahydrofuran solution of aminopropyltriethoxysilane to the preceding solution to give the amine salt and by further diluting the solution thus obtained with tetrahydrofuran to a 10% effective fraction.

REFERENCE EXAMPLE 2

Preparation of fiber treatment agents B1 and B2

(1) Synthesis of allyl ether-containing polyester 290.4 parts isophthalic acid, 58.7 parts glycerol monoallyl ether, 174.7 parts neopentyl glycol, and 35 parts eylene were placed in a four-neck flask equipped with nitrogen inlet, stirrer, thermometer, and reflux condenser equipped with a distillation tube. The temperature was gradually raised to 220° C., and the reaction was continued at this temperature. Heating was discontinued when the acid value of a sample of the reaction product reached 5.0, and the low boiling constituents were then distilled out in vacuo. The product was withdrawn from the flask prior to complete solidification. The allyl ether-containing polyester product had a carbinol content of 1.60%.

(2) Synthesis of the polydimethylsiloxane-grafted polyester

The following were introduced into a 1 liter three-neck flask equipped with stirrer, reflux condenser, and thermometer and dissolved to homogeneity; 100 parts allyl ether-containing polyester from step (1); 500 parts tetrahydrofuran; and 100 parts of a polydimethylsiloxane with an average molecular weight of 1,821 and carrying SiH functionality at one terminal (SiH content=0.0549%, see structure (15) below). After dissolution, the temperature was gradually raised to achieve reflux, at which point a 1% solution of chloroplatinic acid in tetrahydrofuran was added in a quantity sufficient to provide a platinum concentration of 10 parts per 1,000,000 parts reaction mixture. The reaction was carried out under reflux while periodically sampling the reaction mixture onto a glass plate. The solvent was evaporated off, and the reaction was halted when the resulting reaction product was observed to be transparent. Subsequent removal of the solvent by distillation afforded a polydimethylsiloxane-grafted polyester (carbinol content=0.8%) which was solid at room temperature.

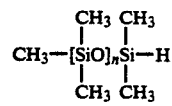
(15)

(3) Synthesis of the carboxyl-containing polydimethylsiloxane-grafted polyester and its amine salt 22.1 parts of the polydimethylsiloxane-grafted polyester from step (2) and 2.0 parts trimellitic anhydride were placed in a 200 mL three-neck flask equipped with stirrer, thermometer, and reflux condenser. The temperature was gradually raised to 170° C., and a reaction was carried out for approximately 40 minutes at 170° to 190° C. Then 24.1 parts tetrahydrofuran was added to provide a 50% solution of the reaction product. The thusly obtained carboxyl-containing polyorganosiloxane-grafted polyester had an acid value of 23.5. This solution of carboxyl-containing polydimethylsiloxane-grafted polyester (50% effective fraction) was designated as fiber treatment agent B1. Fiber treatment agent B2 was prepared by the addition of 8.64 parts of a 50% tetrahydrofuran solution of aminopropyltriethoxysilane to the preceding solution to provide the amine salt and by further diluting the solution thus obtained with tetrahydrofuran to 10% effective fraction.

REFERENCE EXAMPLE 3

Preparation of fiber treatment agents C1 and C2

(1) Synthesis of the polydimethylsiloxane-grafted polyester

The following were introduced into a 1 liter three-neck flask equipped with stirrer, reflux condenser, and thermometer and dissolved to homogeneity: 40 parts allyl ether-containing polyester from step (1) in Reference Example 2; 800 parts tetrahydrofuran; and 160 parts of a polydimethylsiloxane with an average molecular weight of 6,250 and carrying the SiH functionality at one terminal (SiH content=0.016%, see structure (16) below). After dissolution, the temperature was gradually raised to achieve reflux, at which point a 1% solution of chloroplatinic acid in tetrahydrofuran was added in a quantity sufficient to give a platinum concentration of 10 parts per 1,000,000 parts reaction mixture. The reaction was run under reflux while periodically sampling the reaction mixture onto a glass plate. The solvent was evaporated off, and the reaction was halted when the reaction product was observed to be transparent. Subsequent removal of the solvent by distillation afforded a polydimethylsiloxane-grafted polyester (carbinol content=0.32%) which was solid at room temperature.

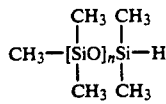

(16)

(2) Synthesis of the carboxyl-containing polydimethylsiloxane-grafted polyester and its amine salt 50 parts of the polydimethylsiloxane-grafted polyester from step (1) and 1.8 parts trimellitic anhydride were placed in a 300 mL three-neck flask equipped with stirrer, thermometer, and reflux condenser. The temperature was gradually raised to 200° C., and a reaction was run for approximately 40 minutes at this temperature. Then 51.8 parts tetrahydrofuran was added to give a 50% solution. The obtained carboxyl-containing polyorganosiloxane-grafted polyester resin had an acid value of 20. This solution of carboxyl-containing polydimethylsiloxane-grafted polyester (50% effective fraction) was designated as fiber treatment agent C1. Fiber treatment agent C2 was prepared by the addition of 8.28 parts of a 50% tetrahydrofuran solution of aminopropyltriethoxysilane to the preceding solution to give the amine salt and by further diluting the solution thus obtained with tetrahydrofuran to 10% effective fraction.

EXAMPLE 1

Treatment baths A1-1, B1-1, and C1-1 were respectively prepared by dissolving 10 parts of each fiber treatment agent A1, B1, and C1 (prepared in Reference Examples 1, 2, and 3) in 990 parts toluene. The test specimen was a 100% cotton knit (optically whitened, 50×50 cm). It was immersed for 10 seconds in the treatment agent, removed, wrung out to an expression ratio of 100% using a wringer roller, spread out at room temperature, and dried. The treatment bath add-on to the knit was 0.5 weight %. The test specimen was subsequently heat treated for 3 minutes in a hot-air drier at 130° C. and removed. The knit was then cut in half along the center, and the handle of one piece was evaluated by tactile manipulation. Four 10×10 cm fabric samples were cut from the other piece, heated for 5 minutes in an oven at 180° C. and removed. These four sheets were stacked upon each other, and the degree of yellowing DYI was calculated using an SM color computer from Suga Test Instruments Company, Limited. The tristimulus values X, Y, and Z were measured, and DYI was then calculated using the following equations. equations for calculating the degree of yellowing:

$$YI = \frac{100(1.28X - 1.06Z)}{Y} \quad \text{(equation 2)}$$

$$\Delta YI = YI_2 - YI_1$$

where
$YI_1$ = yellowness index of blank
$YI_2$ = yellowness index of sample

For comparison, fiber treatment agents D and E (effective component=50%) were respectively prepared by the addition of 50 parts tetrahydrofuran to compounds D and E with the chemical structures given below. These fiber treatment agents were diluted with toluene as above, and the obtained treatment baths were also evaluated as above.

The results of the evaluations are reported in Table 1. The results demonstrate that each of the fiber treatment agents according to the present invention provided a dry touch with little sensation of slickness and had a vanishingly small degree of yellowing. The untreated fabric had a harsh handle and a poor stretch recovery and was easily wrinkled.

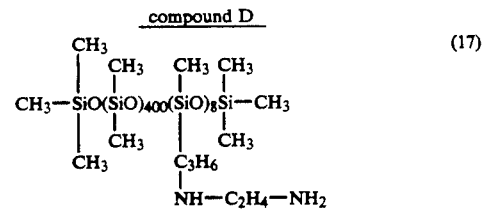

compound D (17)

(viscosity of this compound at 25° C.=1,150 centistokes)

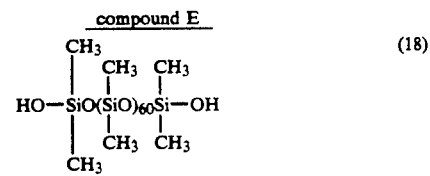

compound E (18)

(viscosity of this compound at 25° C. = 85 centistokes)

TABLE 1

Results of Evaluation I

| treatment bath | handle | degree of yellowing |
|---|---|---|
| present invention | | |
| A1-1 | excellent handle, dry touch which lacks any slick feel, resists wrinkling; also suitable as underwear; good stretch recovery | 0.28 |
| B1-1 | excellent handle, dry touch which lacks any slick feel, resists wrinkling; also suitable as underwear; good stretch recovery | 0.20 |
| C1-1 | excellent handle, dry touch which lacks any slick feel, resists wrinkling; also suitable as underwear; good stretch recovery | 0.21 |
| comparison examples | | |
| D | soft handle, but too slick; good stretch recovery | 6.36 |
| E | unsatisfactory handle, slight sensation of slickness; unsatisfactory as underwear; easily wrinkled | 0.25 |

EXAMPLE 2

Treatment baths A2-2 and C2-2 were respectively prepared by the dissolution of 25 parts of each fiber treatment agent A2 and C2 (from Reference Examples 1 and 3) in 475 parts toluene. 50 parts polyester staple fiber for application as quilt filling was immersed for 10 seconds in the particular treatment bath, and the treatment bath (A2-2 or C2-2) was then adjusted using a centrifugal bath separator to a 0.5% add-on referred to as the polyester staple fiber. After removal of the solvent at room temperature, heat treatment was carried out for 5 minutes at 130° C.

The static friction coefficient and dynamic friction coefficient were each measured by fiber/fiber crossing. Subsequently the treated polyester staple fiber was spread using a spreader, and the feather-like handle was compared by tactile manipulation. In the comparison examples, polyester staple fiber was treated with fiber treatment bath E from Example 1 and with fiber treatment bath F prepared as follows. The same evaluations as above were also conducted in this case. Fiber treatment bath F was prepared by dissolving the following to homogeneity in 498 parts toluene: 2.5 parts aminomodified oil with the average chemical structural formula given below, 0.063 parts beta-aminoethylaminopropylmethyldimethoxysilane, and 0.063 parts glycidoxypropyltrimethoxysilane.

The results of these evaluations are reported in Table 2. These results demonstrate that the polyester staple fiber quilt fill treated with treatment bath A2-2 or C2-2 had a very small static and dynamic friction coefficients, excellent handle, absence of slick feel, and a light handle with a feather-like feel.

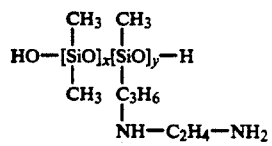

(equation 3)

wherein: $\dfrac{y \cdot 100}{x + y} = 0.4$ (viscosity of this compound at 25° C. = 30 centistokes)

TABLE 2

Results of Evaluation II

| treatment bath | static friction coefficient | dynamic friction coefficient | handle |
|---|---|---|---|
| present invention | | | |
| A2-2 | 0.153 | 0.122 | light and feather-like, very smooth; high compression recovery, soft feel; very suitable as quilt fill |
| C2-2 | 0.105 | 0.091 | light and feather-like, very smooth; high compression recovery, soft feel; very suitable as quilt fill |
| comparison examples | | | |
| E | 0.302 | 0.210 | no effects from treatment were observed |
| F | 0.258 | 0.193 | moderately good handle, very slick |
| none | 0.327 | 0.227 | poor handle, unsatisfactory as quilt fill |

EXAMPLE 3

The following treatment baths were used in this example: (i) treatment baths A2-2 and C2-2 (0.5% effective fraction) as prepared in Example 2, (ii) treatment bath B2-2 (0.5% effective fraction) which was prepared by dilution of fiber treatment agent B2 from Reference Example 2, and (iii) treatment baths D and E. Doeskin fabric made from polyester filament processed yarn was cut into 50×50 cm pieces, which were immersed in the particular treatment bath and then adjusted to an expression ratio of 100% using a mangle roll. The specimens were suspended at room temperature and dried and then heat treated for 2 minutes at 150° C. The flexural rigidity (indicative of flexibility) was measured by the Clark method and the crease resistance was measured by the Monsanto method (in each case only for the fill direction). The handle of the remaining fabric was evaluated by tactile manipulation.

The results of these evaluations are reported in Table 3. These results confirmed that each treatment bath provided an excellent crease resistance, flexibility, and dry-touch handle, and was very suitable for application as a treatment agent for outer garments.

TABLE 3

Results of Evaluation III

| treatment bath | crease resistance (%) | flexural rigidity (mm) | handle |
|---|---|---|---|
| present invention | | | |
| A2-2 | 89 | 53 | slick feel is absent, good handle and dry touch; resists wrinkling; very suitable as treatment agent for outer garments |
| B2-2 | 89 | 52 | same as above |
| C2-2 | 90 | 52 | same as above |
| comparison examples | | | |
| D | 89 | 60 | although resistant to wrinkling, a slick feel is present; not an optimal treatment agent for outer garments |

TABLE 3-continued

| treatment bath | Results of Evaluation III | | |
| --- | --- | --- | --- |
| | crease resistance (%) | flexural rigidity (mm) | handle |
| E | 79 | 56 | unsatisfactory handle, prone to wrinkling, unsatisfactory as a treatment agent |
| none | 72 | 57 | harsh handle |

EXAMPLE 4

The following were added to 300 parts of the carboxyl-containing polydimethylsiloxane-grafted polyester solution (acid value=64.4) prepared in Reference Example 1 as fiber treatment agent A1: 15 parts toluene, 12 parts polyoxyethylene lauryl ether (ethylene oxide=6 moles), 18 parts polyoxyethylene lauryl ether (ethylene oxide=8 moles), 5 parts polyoxyethylene nonylphenol ether (ethylene oxide=9.5 moles), and 800 parts water. A homogeneous emulsion was then prepared using a stirrer and homomixer. A treatment bath G was prepared by the addition of 1,490 parts water to 10 parts of this emulsion with dissolution/dispersion to homogeneity. Knit underwear made from 65 weight % polyester/35 weight % cotton blended yarn was immersed for 20 seconds in treatment bath G, withdrawn, wrung out to an expression ratio of 100% using a mangle roll, and dried at room temperature. This was followed by heat treatment for 5 minutes in a hot-air drier at 130° C. The treated fabric was very smooth and light, had an excellent stretch recovery, and resisted wrinkling. This treatment agent was therefore also well suited for application to knits.

EXAMPLE 5

Fiber treatment agent H was prepared by the same reaction process as in Reference Examples 1 to 3. In this example, an unsaturated polyester resin with carbinol content=2.88 weight % was synthesized from 124.8 parts neopentyl glycol, 79.2 parts glycerol monoallyl ether, 80.4 parts trimethylolpropane, and 348.6 parts isophthalic acid. An addition reaction was then run using 10.0 parts of this polyester resin, 38.0 parts of the polydimethylsiloxane used in Reference Example 3 (average molecular weight=6,250, SiH at one terminal), 272 parts tetrahydrofuran, and the 1 weight % chloroplatinic acid solution in the specified quantity, thus affording a solution of polydimethylsiloxane-grafted polyester resin. Fiber treatment agent H was prepared by dilution with tetrahydrofuran to a 0.5 weight % effective fraction. Polyester staple fiber for quilt filling was immersed in this treatment bath for 10 seconds, and fiber treatment bath H was adjusted using a centrifugal bath separator to a 0.5 weight % add-on referred to as the polyester staple fiber. Heat treatment was then conducted for 5 minutes at 130° C. after evaporation of the solvent at room temperature.

The handle of the treated polyester staple fiber was evaluated by tactile manipulation. The polyester staple fiber treated with fiber treatment agent H had an excellent handle, was free of slickness, and had a light handle with a feather-like feel.

The fiber treatment agent according to the present invention has a structure in which a polyorganosiloxane molecule is grafted as a side chain into a polyester main chain. As a consequence of this structure, the fiber treatment agent according to the present invention not only provides a very good smoothness, but also gives very low values for the fiber/fiber static and dynamic friction coefficients which in fact are beyond the capability of previous organopolysiloxane-based fiber treatment agents. In the particular application as a treatment agent for providing polyester quilt fill with a feather-like quality, it imparts the desirable treatment effects of a very good smoothness with a dry touch, and an unusually good feel.

It will be apparent from the foregoing that many other variations and modifications may be made in the compounds, compositions, structures, and methods described herein without departing substantially from the essential features and concepts of the present invention. Accordingly, it should be clearly understood that the forms of the invention described herein are exemplary only and are not intended as limitations on the scope of the present invention as defined in the appended claims.

That which is claimed is:

1. A method of treating fibrous material comprising depositing on the fibrous material 0.01 to 5.0 percent by weight based on the weight of the fibrous material of a fiber treating agent comprising a silicone modified polyester in which a polyester has a polyorganosiloxane grafted thereto, the grafted polyester being the reaction product of an allyl ether containing polyester and a polyorganosiloxane wherein at least one of the silicon atoms of the polyorganosiloxane has a hydrogen atom attached thereto; the allyl ether containing polyester being formed by combining a polycarboxylic acid and a polyhydric alcohol; the polycarboxylic acid being selected from the group consisting of adipic acid, phthalic anhydride, isophthalic acid, and terephthalic acid; the polyhydric alcohol being selected from the group consisting of ethylene glycol, neopentyl glycol, trimethylolpropane, trimethylolethane, trimethylolpropane monoallyl ether, trimethylolethane monoallyl ether, glycerol, glycerol monoallyl ether, pentaerythritol, pentaerythritol monoallyl ether, and pentaerythritol diallyl ether.

2. The method according to claim 1 in which the hydrogen atom is attached to one terminal end of the polyorganosiloxane.

3. The method according to claim 1 in which a modified reaction product is formed by reacting the reaction product with a carboxylic anhydride.

4. The method according to claim 3 in which an amine salt of the modified reaction product is formed by reacting the modified reaction product with an aminoalkylalkoxysilane.

5. The method according to claim 3 in which the polycarboxylic anhydride is selected from the group consisting of succinic anhydride, citraconic anhydride, itaconic anhydride, dodecenylsuccinic anhydride, maleic anhydride, hexahydrophthalic anhydride, methyltetrahydrophthalic anhydride, phthalic anhydride, trimellitic anhydride, pyromellitic anhydride, methylnadic anhydride, and 3,3',4,4'-benzophenonetetracarboxylic anhydride.

6. The method according to claim 3 in which the modified reaction product is dissolved in a solvent selected from the group consisting of toluene, xylene, benzene, n-hexane, heptane, acetone, methyl ethyl ketone, methyl isobutyl ketone, ethyl acetate, butyl acetate, mineral terpene, perchloroethylene, trichloroethylene, and tetrahydrofuran.

7. The method according to claim 3 in which the modified reaction product is formed into an emulsion containing the modified reaction product; water; and a surfactant selected from the group consisting of nonionic surfactants, anionic surfactants, and combinations thereof.

8. The method according to claim 4 in which the amine salt of the modified reaction product is dissolved in a solvent selected from the group consisting of toluene, xylene, benzene, n-hexane, heptane, acetone, methyl ethyl ketone, methyl isobutyl ketone, ethyl acetate, butyl acetate, mineral terpene, perchloroethylene, trichloroethylene, and tetrahydrofuran.

9. The method according to claim 4 in which the amine salt of the modified reaction product is formed into an emulsion containing the amine salt of the modified reaction product; water; and a surfactant selected from the group consisting of nonionic surfactants, anionic surfactants, and combinations thereof.

* * * * *